United States Patent [19]

James et al.

[11] 4,214,610

[45] Jul. 29, 1980

[54] FLOW CONTROL SYSTEM FOR CONCENTRIC ANNULAR FLUID STREAMS

[75] Inventors: Varnell L. James, Kent; George B. Evelyn, Bellevue, both of Wash.

[73] Assignee: The Boeing Company, Seattle, Wash.

[21] Appl. No.: 854,636

[22] Filed: Nov. 25, 1977

[51] Int. Cl.² .............................................. F02K 3/06
[52] U.S. Cl. .................................. 137/597; 60/226 B; 137/599
[58] Field of Search ............. 137/597, 599; 60/226 R, 60/226 B, 244, 262

[56] References Cited

U.S. PATENT DOCUMENTS

| 3,779,282 | 12/1973 | Klees | 137/625.46 |
| 3,792,584 | 2/1974 | Klees | 60/226 B X |
| 3,841,091 | 10/1974 | Sargisson | 60/262 X |

*Primary Examiner*—Robert G. Nilson
*Attorney, Agent, or Firm*—Christensen, O'Connor, Johnson & Kindness

[57] ABSTRACT

A flow control system selectively operable to either invert the relative position of first and second coaxially flowing fluid streams or to combine the two fluid streams for discharge as a single annular fluid stream is disclosed. The system includes a longitudinally extending input transition section which is partitioned into separate flow passages that receive sectorial regions of the first and second annular fluid streams and redirect the fluid streams into a segmented annular flow pattern in which portions of the first and second fluid streams form circumferentially extending annular sectors that are interspersed in circumferential alternation. Fluid exiting the input transition section flows into a longitudinally extending valve section having entrance and exit openings of geometry substantially identical to the segmented annular exit opening of the input transition section. The valve section is operable to exit the fluid streams in the same flow pattern provided by the input transition section or to cause those portions of the fluid flow corresponding with one of the original fluid streams to combine with the fluid flow corresponding to the other original fluid stream such that flow exits the valve section through alternate ones of the circumferentially extending annular sectors. An output transition section, having an entrance opening corresponding to the segmented annular geometry of the valve section, receives the flow provided by the valve section and redirects the flow for discharge as concentric annular flow streams wherein the outermost of the two original fluid streams is discharged as the innermost fluid stream. When the valve is operated to mix the two fluid streams, the combined fluid flow exits either the inner or outer discharge opening of the output transition section, depending on the configuration of the valve section.

11 Claims, 8 Drawing Figures

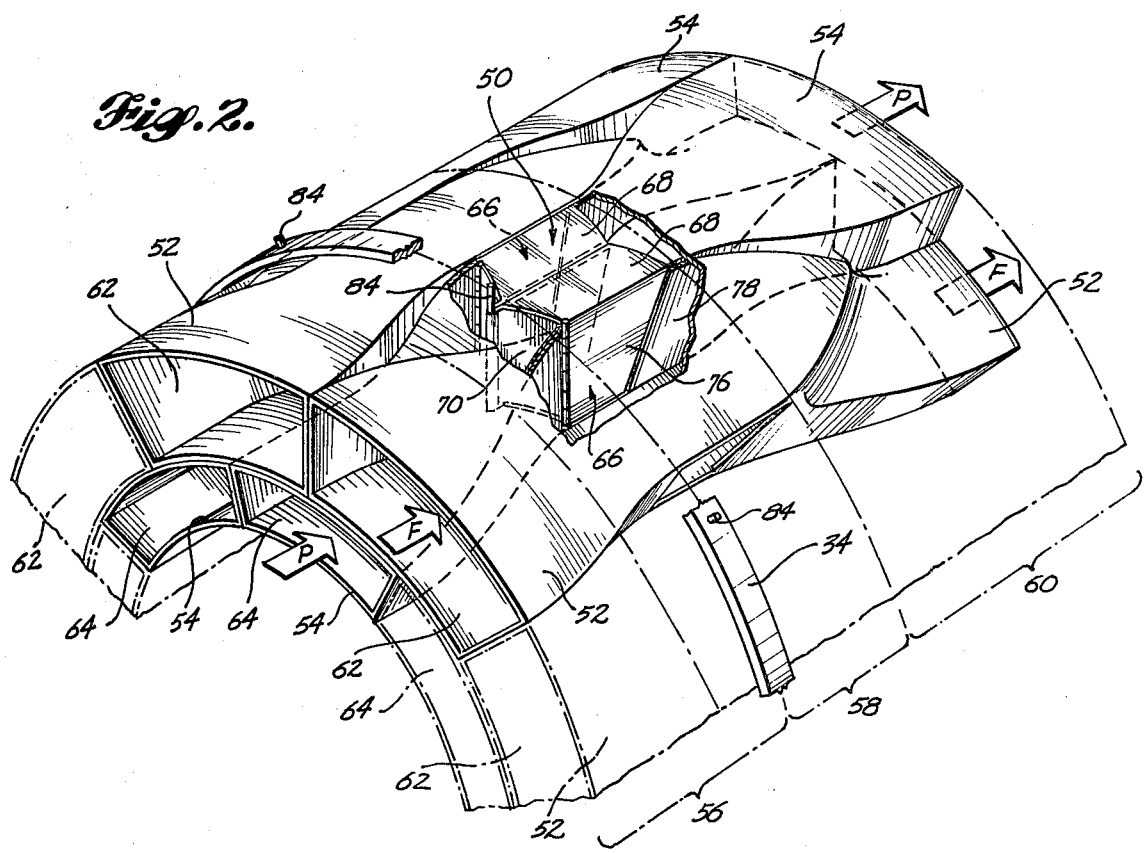
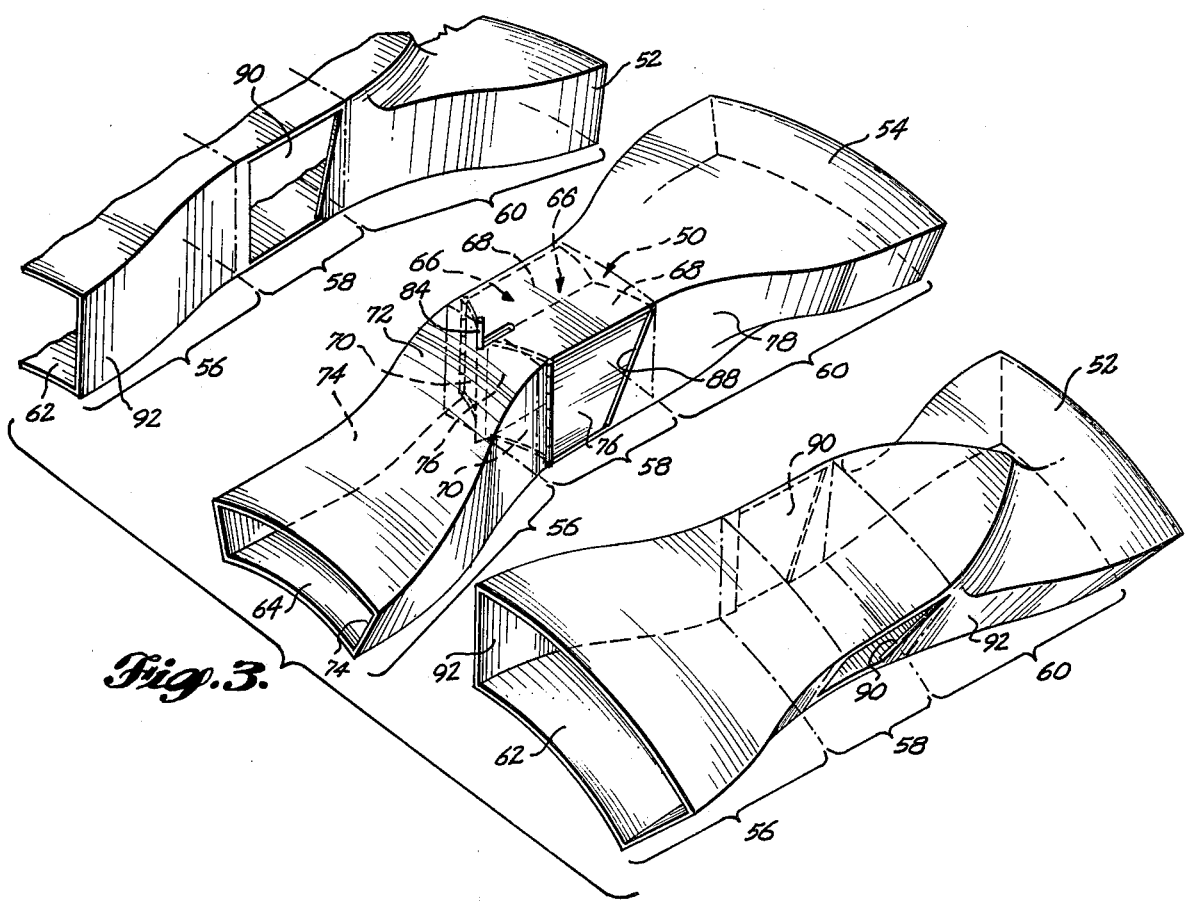

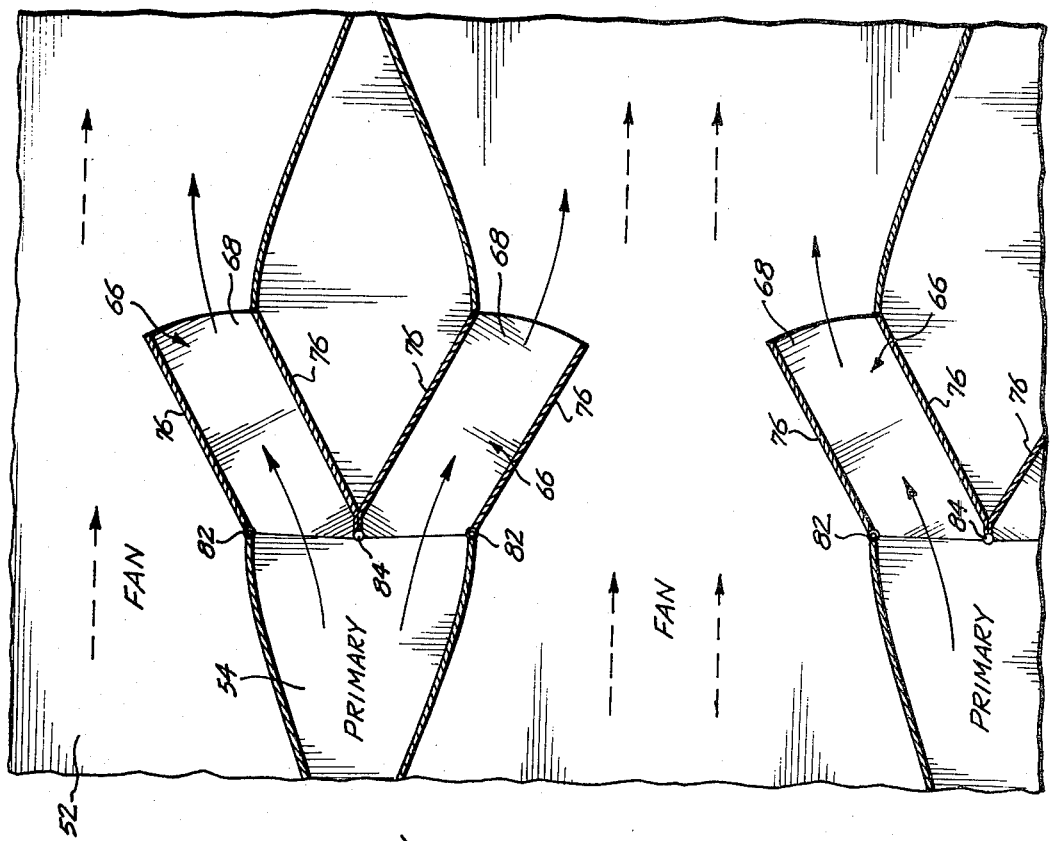
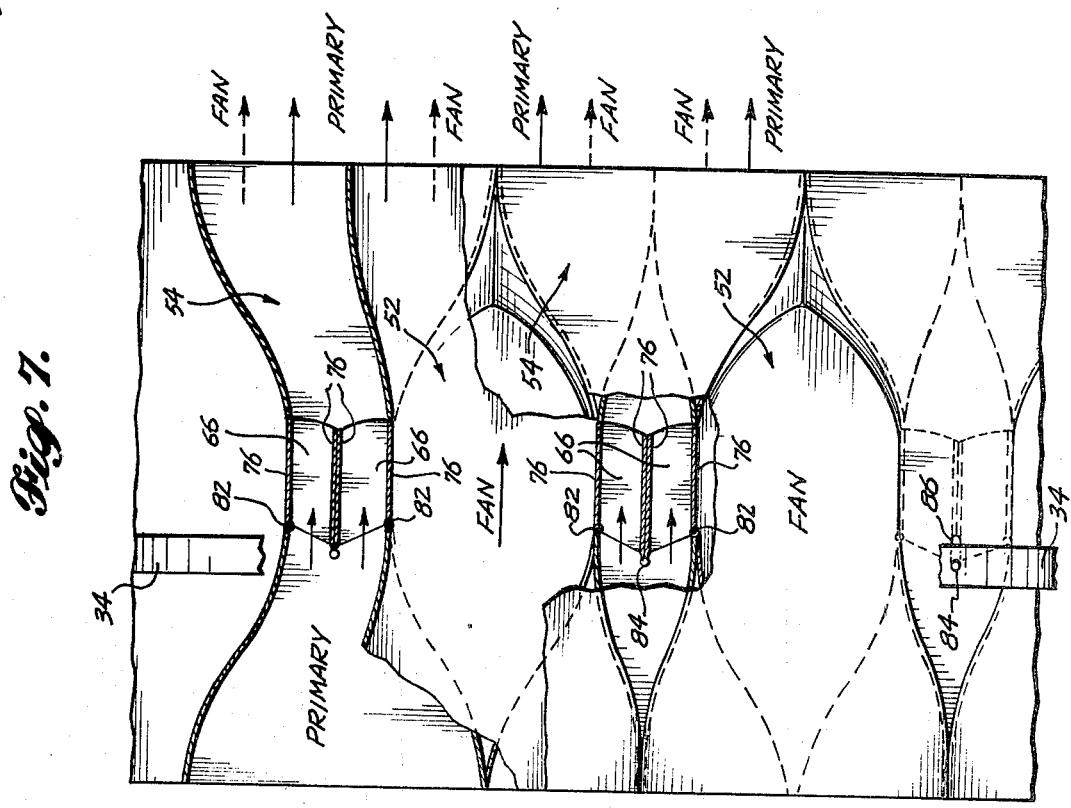

FLOW CONTROL SYSTEM FOR CONCENTRIC ANNULAR FLUID STREAMS

BACKGROUND OF THE INVENTION

This invention relates to the flow management of concentrically flowing annular fluid streams. More particularly, this invention relates to apparatus operable to invert the flow pattern of two concentric annular flow streams and operable to combine the two flow streams for discharge as a single annular flow stream.

It is sometimes necessary or desirable to invert the flow pattern formed by two fluid streams that flow through concentrically arranged annular flow ducts such that the fluid stream originally occupying the innermost annular portion of the flow pattern concentrically surrounds the fluid stream that originally formed the outermost portion of the flow pattern. In some situations, designing apparatus for effecting such flow inversion is greatly complicated by various constraints.

For example, in U.S. Pat. Nos. 3,779,282 and 3,792,584, issued to Gary W. Klees and assigned to the assignee of this invention, flow inversion apparatus is disclosed which can be utilized within gas turbine engines for directing and managing various coaxially flowing annular fluid streams such as those routed to or from the fan and compressor stages of the gas turbine engine, auxiliary air intakes, and exhaust nozzles. As is disclosed in the aforementioned patents, and is recognized within the art, flow management within a gas turbine engine should preferably be accomplished within the space confines defined by the ducts which contain and direct the coaxially flowing fluid streams. Further, to prevent undesirable energy losses from occurring, the fluid passages necessary to invert the flow pattern must be smoothly contoured and exhibit a relatively constant cross-sectional area.

In the flow inversion arrangements disclosed in the Klees patents, a plurality of longitudinally extending thin-walled duct elements nest together to form an axially extending annular assemblage. The duct elements are contoured and arranged such that, with respect to the direction of fluid flow, the forward or entrance end of the assemblage forms two concentrically arranged annular openings wherein the forward ends of individual duct elements partition the annular openings into equal area annular sectors. Thus, as the two concentrically flowing fluid streams are received by such flow inversion arrangement, each of the fluid streams is divided into a plurality of separate flow streams with each of the flow streams being contained and directed by one of the duct elements.

To effect the desired "crossover" or flow inversion, the individual duct elements that form the center or inner annular entrance opening smoothly change in cross-sectional geometry while remaining of substantially constant cross-sectional area to gradually direct the centroid of the flow stream travelling therethrough outwardly toward the outer circumference of the annular envelope defined by the assemblage of duct elements. The duct elements that form the sectored outer annular entrance opening are shaped and contoured in essentially a complementary manner to those duct elements which receive the inner fluid stream to gradually direct the centroid of the flow streams passing therethrough inwardly toward the inner circumference of the annular envelope provided by the assemblage. In particular, the complementary contouring of the duct elements for receiving and subdividing each of the fluid streams causes the individual flow streams formed thereby to assume a flow pattern which is annular in geometry with the flow streams derived from each of the received annular fluid streams being circumferentially interspersed segments of the annular flow pattern.

With continued reference to the direction of fluid flow, the duct elements which contain and direct a portion of the fluid flow of the received outer annular flow stream then smoothly change in geometry while maintaining substantially constant cross-sectional area to move the centroid of the fluid streams flowing therethrough gradually inward. In a complementary manner, the duct elements which contain and direct portions of the received inner annular flow stream smoothly change in geometry while maintaining substantially constant cross-sectional area to direct the centroid of the fluid streams flowing therethrough gradually outward. In particular, the duct elements are configured and arranged such that concentric annular discharge openings are defined in the exit plane of the assemblage with each duct element forming a sector of either the inner or outer annular discharge opening. Since a duct element which receives a sectorial portion of the received inner annular flow stream forms a sector of the outer discharge annulus and a duct element which receives a sectorial portion of the received outer annular flow stream forms a sector of the inner discharge annulus, the desired flow inversion is effected. Since each duct element is of relatively constant cross-sectional area and smoothly changes in cross-sectional geometry, little or no energy losses occur. Further, because of the geometry of each duct element, the nested assemblage of duct elements effectively forms an extension of the annular flow ducts which originally contained and directed the fluid streams, i.e., the envelope of the flow inversion apparatus need not extend radially outward beyond the outer diameter of the ducts which contain and direct the original flow streams.

In situations in which the received coaxial flowing annular flow streams are to be selectively discharged in the original flow pattern or discharged with an inverted flow pattern, the flow inversion device of Klees is divided into an upstream and a downstream portion at the above-mentioned plane at which the flow streams of the two fluid streams occupy circumferentially interspersed segments of a single annular flow pattern. In such an embodiment of the Klees apparatus, which is necessarily limited to situations in which the cross-sectional area of the two received fluid streams are equal, n duct elements for directing a portion of the received inner annular flow stream and n duct elements for directing a portion of the received outer annular flow stream are employed with each of the duct elements being of equal area at every position along the length of the flow system. Switching between the previously described flow inversion configuration and a "straight through" flow configuration is effected in such an embodiment by rotating either the upstream or downstream portion of the flow inversion apparatus by an angle of $\pi/n$ radians. Such an angular displacement causes duct elements of the downstream portion which are respectively aligned with duct elements of the upstream portion that receive the outer and inner fluid streams when the system is operated in the flow inversion mode to become respectively aligned with duct elements that receive the opposite one of the two received fluid streams.

Although a flow management system of the type disclosed by Klees is highly satisfactory in situations requiring flow inversion or selective operation in a flow inversion mode and a straight through flow mode, such a system is not applicable to other flow control situations. For example, in one type of gas turbine engine that is commonly referred to as a multicycle engine and used to propel aircraft, it is necessary not only to invert inner and outer concentric annular flow streams during certain operating modes of the engine, but also to combine the two flow streams for discharge as a single annular flow stream during other engine operating modes. More specifically, in this type of engine, the engine core delivers combustion products in an annular flow pattern that is coaxially surrounded by an annular fluid stream that is supplied through an annular flow duct by the engine fan stage. During certain modes of operation such as aircraft takeoff, climb and high speed (e.g., supersonic) cruise, the two fluid streams are inverted such that the flow provided by the fan stage drives an aft turbine stage and the combustion products supplied by the engine core flow through an annular duct that concentrically surrounds the aft turbine stage. During other modes of operation such as are employed in a flight regime commonly referred to as holding, and during supersonic cruise operation in which maximum thrust is not required, the flow provided by the fan stage and the combustion products provided by the engine core are combined to drive the aft turbine, and no fluid is exited through the annular flow duct that extends rearwardly about the aft turbine. As is known by those skilled in the art, the use of such a gas turbine engine, preferably with the selective burning of fuel in the region of the fan duct (i.e., "duct-burning"), provides an efficient, relatively low-noise engine which meets the various operational demands for engines that propel aircraft that operate in both subsonic and supersonic flight regimes.

A flow control system operable to invert a received concentric annular flow pattern and operable to combine the two received flow streams for discharge as a single annular flow stream can be subject to design constraints in addition to the previously noted volume and flow passage constraints. For example, in the above described multicycle gas turbine engine, the means employed within the flow control system to cause the selective flow inversion or discharge as a single, annular flow stream should not be structurally complex to thereby ensure that the flow control system is reliable and is relatively economical to fabricate and maintain. Further, because fluid supplied by the fan stage and the core generator are at a relatively high temperature, relatively high fluid pressure, and flow with considerable particle velocity, the mechanism for causing the selective flow inversion or single stream discharge should be arranged for operation by relatively low operative forces and be substantially unaffected by wide variations in temperature. Additionally, to provide essentially fail-safe operation, preferably such a flow control system should be arranged such that abrupt switching from one mode of operation to the other does not occur upon operational failure of the means for actuating the flow control system.

Accordingly, it is an object of this invention to provide a flow control system that is operable to invert two concentrically arranged annular fluid streams and is operable to discharge the two fluid streams as a single fluid stream of angular cross section geometry.

It is a further object of this invention to provide a flow control system of the above-described type wherein such flow control is effected within a specific volume having relatively low axial length and having an annular envelope of inner and outer diameter not substantially exceeding that of the flow ducts the supply the concentrically arranged fluid stream.

It is yet another object of this invention to provide a flow control system of the above-described type that is operable by relatively low actuation forces.

It is still another object of this invention to provide a flow control system of the above-described type for use in a gas turbine engine wherein failure of the system actuation device does not cause the flow control system to abruptly switch operational modes.

SUMMARY OF THE INVENTION

In accordance with this invention, these and other objects are achieved by an axially extending flow control system which is functionally divisible, and in some embodiments physically divided, into three serially arranged duct sections. The forwardmost section, referred to herein as an input transition section, includes a plurality of individual duct elements that nest with one another to form an assemblage having an annular cross section geometry. In particular, the duct elements of the input transition system are configured such that the forward end of the assemblage includes two concentrically arranged annular inlet openings wherein the openings of the individual duct elements each form a circumferentially extending sector of one of the two annular inlet openings.

In accordance with the teachings of the previously reference Klees patents, the duct elements of the input transition section effectively subdivide the original fluid streams into a first and second plurality of individual flow streams which respectively correspond to the fluid flow of the outer and inner flow stream of the original concentrically arranged annular flow pattern. As in the flow control apparatus disclosed by Klees, the cross-sectional area of each duct element is maintained substantially constant along each of the defined flow paths and, at the aft end of the input transition section, the duct elements cause the two fluid streams to assume a flow pattern of annular geometry that is sectorially segmented by the duct elements such that flow streams correspond to the received outer fluid stream.

The input transition system is followed by an axially extending valve section having a sectorially segmented annular entrance and exit opening that corresponds to the geometry defined at the exit plane of the input transition section. The valve section is configured and arranged such that in one operative condition thereof the first and second plurality of flow streams are maintained in the same flow pattern that is established at the exit plane of the input transition section, i.e., maintained as circumferentially interspersed sectors of an annular flow pattern. When the valve section is operated to cause the flow control system to combine the two fluid streams for discharge as a single annular fluid stream, those flow streams corresponding to either the inner or outer annular flow stream of the original flow pattern are caused to flow into the plurality of flow streams that are derived from the other fluid stream. With the valve section thus operated, portions of the concentric annular fluid streams supplied to the inlet end of the flow control system exit the valve section through alternate ones of the circumferentially arranged annular segments that form the annular cross-sectional geometry of the valve section exit plane.

More specifically, in the disclosed embodiment of the invention, the valve section is subdivided into a plurality of axially extending flow passages corresponding in cross-sectional geometry to a sector of the annular flow pattern defined at the exit plane of the input transition section. Alternate ones of the circumferentially arranged annular valve segments, for example, those which carry the flow streams derived from the inner fluid stream of the received fluid streams, are formed by a pair of actually extending valve segments each having a cross-sectional geometry that corresponds to one half of the cross-sectional geometry of the associated duct passage. The radially juxtaposed edges of the forward end of each pair of valve segments are hinged together and include a pin that extends radially outward from the outer circumference of the valve segment. The radially extending forward edge of each valve segment that is oppositely disposed from the hinged together juxtaposed edges are hinged to the radially extending walls of the valve section that separate the adjacent portions of the two fluid streams from one another. Openings in these separation walls are sized to permit the aft ends of the hinged together valve segments to move apart from one another such that the aft ends swing circumferentially into the adjacent valve section passages as the radially extending pin is slid in the direction of fluid flow.

A unison ring surrounds the outer periphery of the valve section with each of the radially extending pins passing into openings of the unison ring. When the unison ring is activated to a forwardmost position, the hinged together valve segments extend in axial juxtaposition with one another to form the fluid passages that discharge the flow streams derived from the inner annular fluid stream of the original flow pattern as alternate ones of the circumferentially extending annular segments defined by the exit plane of the valve section. When the unison ring is moved axially in the direction of the fluid flow, the radially extending pins move rearwardly in axially extending slots to cause the aft ends of each pair of hinged together valve segments to swing into the adjacent valve passages that carry portions of the other fluid stream. Thus, the flow streams contained by the hinged together valve segments are effectively injected into the flow streams passing through adjacent ones of the valve passages and mixed portions of the two fluid steams exit the valve section from those annular sectors which normally carry the fluid streams derived from the outer flow stream of the original concentric annular flow pattern.

An axially extending output transition section receives the fluid flow provided by the valve section and completes the flow control system of this invention. The output transition section is configured and arranged similar to the input transition section and, in the preferred embodiment of the invention, consists of a nested assemblage individual duct elements. In particular, the output section duct elements are configured and arranged such that the inlet opening of the output transition section is a segmented opening of annular geometry which corresponds to the segmented annular exit geometry of the valve section. Similar to the duct elements of the input transition section, each output section duct element defines an axially extending passage for receiving and containing the flow streams that exit the valve section. With respect to the direction of fluid flow, duct elements that define adjacent ones of the annular sectors of the entrance opening in the output transition section transist in geometry so as to maintain substantially constant cross sectional area while redirecting the fluid flowing through alternate ones of the duct element for discharge as adjacent sectors of two concentrically arranged annular exit openings. Since the duct elements of the output transition system are arranged such that sectorial annular portions of the outer annular flow stream of the original flow pattern are discharged through sectorial segments of the segmented inner annular exit opening of the output transition section while the sectorially subdivided inner flow stream of the original flow pattern is discharged through the segmented outer annular exit opening of the output transition section, flow inversion is effected when the unison ring is operated to the forwardmost position. On the other hand, when the unison ring is operated to a rearward position, the flow steams derived from the inner fluid stream of the original flow pattern are injected or discharged into the flow streams that are derived from the outer fluid stream within the valve section and the combined fluid flow is discharged from the inner annular exit openings of the output transition section.

With respect to the previously mentioned multicycle gas turbine engine arrangement, the flow control system of this invention thus permits operation in a first mode wherein an annular rearwardly flowing fan stream and a coaxially contained annular stream of combustion products are inverted or "crossed over" such that the fan stream drives an aft turbine stage and the combustion products are discharged through an annular flow duct that surrounds the aft turbine. Further, when the flow control system of this invention is employed in such an engine arrangement, activation of the valve section provides a mode of operation wherein the two fluid streams are combined with one another and discharged as a single annular fluid stream for driving the aft turbine stage.

Since the boundary walls of the hinged together valve segments are subjected to essentially the same fluid pressure during the flow inverting mode of operation, relatively low operational force is required to move the unison ring rearwardly to combine both fluid streams for operating the aft turbine. Further, in both modes of operation the hinged together valve segments are subjected to substantially balanced pressure conditions and, should the flow control system activation system fail, the valve segments will not abruptly switch to the opposite mode of operation.

BRIEF DESCRIPTION OF THE DRAWINGS

Other objects and advantages of the present invention will be apparent to one skilled in the art after a reading of the following description taken together with the accompanying drawings in which:

FIG. 2 is a partially cut away perspective view of a flow control system of this invention which illustrates the input transition section, the valve section, and the output transition section with the flow control system being depicted in the flow inversion mode of operation;

FIG. 3 is an exploded perspective view illustrating three adjacent duct elements which nest together to form the flow control system of this invention;

FIGS. 7 and 8 schematically depict the operation of the invention to effect flow inversion and discharge of both received annular flow streams as a single annular fluid stream, with FIG. 7 depicting the valve section operated for flow inversion and FIG. 8 depicting the valve section operated for discharge of the single annular fluid stream.

DETAILED DESCRIPTION

Figure 1:
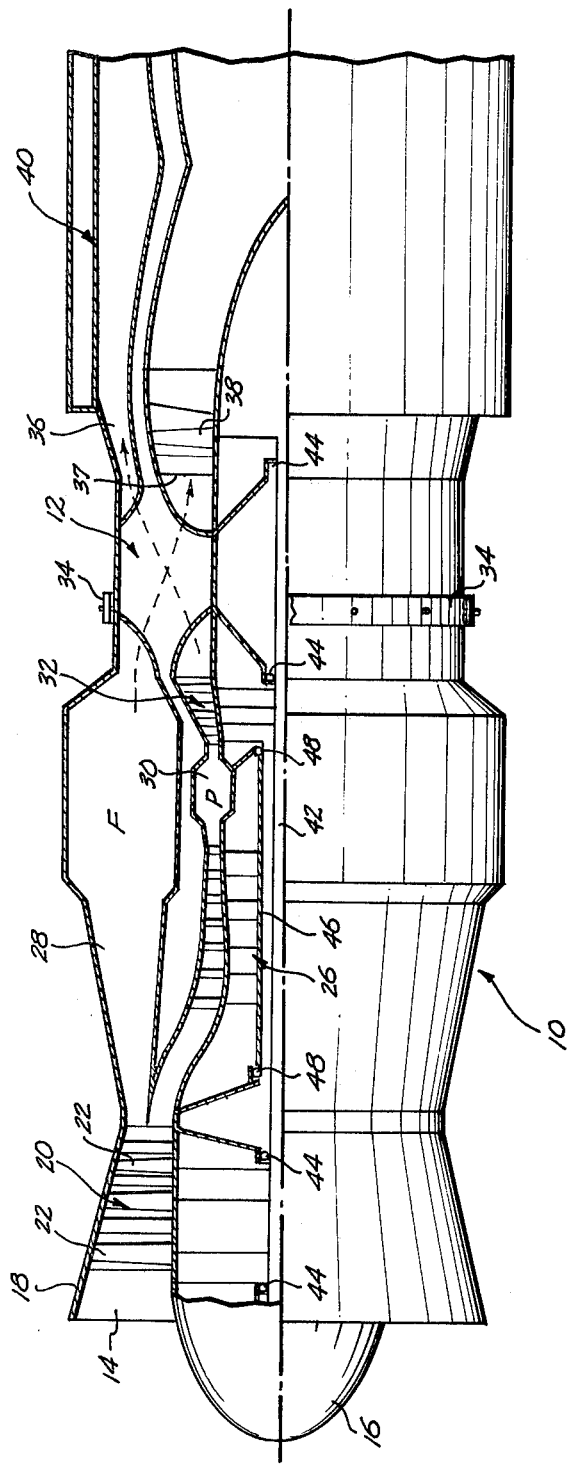
FIG. 1 is a schematic cross-sectional view of a multicycle gas turbine engine incorporating a flow control system of this invention.
Figure 4:
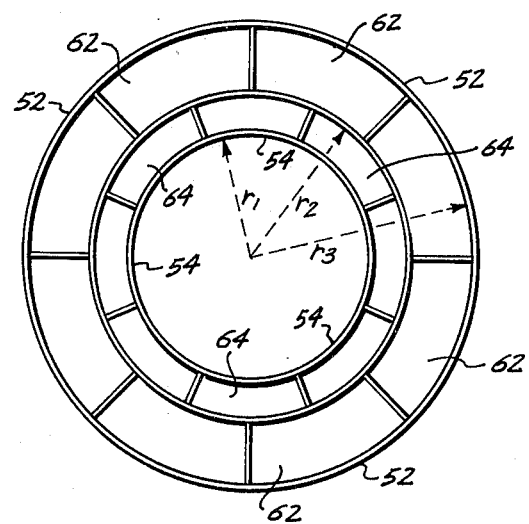
FIGS. 4, 5 and 6 are transverse cross-sectional views of the flow control system of this invention respectively depicting the cross-sectional entrance geometry of the flow control system of this plane, the cross-sectional geometry of the valve section, and the cross-sectional geometry of the outlet opening of the invention.

FIG. 1 depicts a gas turbine engine of the multicycle variety (generally denoted by the numeral 10) which includes a flow control system 12 constructed in accordance with the principles of this invention. In the gas turbine engine 10, atmospheric air enters an annular air inlet opening 14 defined between a forwardly extending center body 16 and a nacelle or outer housing 18, which circumferentially surrounds the center body 16. A fan stage 20, which includes a plurality of stators 22 and rotors 24, compresses the air for delivery to an axial compressor stage 26 and an annular fan duct 28, which circumferentially surrounds the compressor stage 26. That portion of the air delivered to the compressor stage 26 is further compressed and delivered to a combustor assembly 30. Fuel, injected into the combustor assembly 30, is ignited to form combustion products that flow rearwardly from the combustor 30 into a forward turbine stage 32.

As can be seen in FIG. 1, the annular fan duct 28 extends rearwardly to effectively encompass the axial compressor 26, the combustor assembly 30 and the turbine stage 32. Thus, when viewed in cross section at the outlet opening of the turbine stage 32, the fan duct 28 supplies an annular fluid stream which coaxially surrounds the annular fluid stream supplied by the primary or core generator of the engine, i.e., the combination of the axial compressor 26, the combustor assembly 30, and the forward turbine stage 32. As is understood by those skilled in the art, the fan duct 28 of the depicted type of multicycle engine is often equipped for "duct-burning" wherein additional fuel is injected into a portion of the fan duct and ignited to provide additional thrust. Although not specifically depicted in FIG. 1, such "duct-burning" apparatus is generally contained in the enlarged portion of the fan duct 28 which coaxially surrounds the aft portion of the axial compressor 26 and the combustor assembly 30.

The annular stream of combustion products, referred to herein as the primary flow is supplied at the exit opening of the forward turbine stage 32 and the annular stream of fan air, which is supplied at the exit opening of the fan duct 28 and coaxially surrounds the annular stream of primary flow, is received at the forward face of the flow control system 12 with the flow control system 12 being configured and arranged for discharging the two fluid streams as concentrically flowing annular fluid streams, wherein the flow pattern is inverted such that the primary fluid stream coaxially surrounds the fan stream or for combining the primary and fan streams for discharge as a single annular fluid stream. More specifically, and as shall be described in detail hereinafter, a unison ring 34 circumferentially surrounds the outer boundary of the flow control system 12 to simultaneously activate a plurality of valve sections that are contained within the flow control system 12. When the unison ring 34 is in the depicted forward position, the above-described flow inversion is effected such that the primary fluid stream is discharged into an annular duct 36 which coaxially surrounds an aft turbine stage 38 and the fan stream is discharged into the annular inlet opening 37 of the aft turbine stage 38. On the other hand, when the unison ring 34 is slid rearwardly along the outer boundary of the flow control system 12, the valve sections of the flow control system 12 cause the fluid streams to be combined and discharged into the annular inlet opening of the aft turbine 38. Fluid flowing through the duct 36 and exiting from the aft turbine stage 38 flows into and through a conventional exhaust nozzle 40 for discharge into other atmosphere as a thrust-producing fluid stream.

Thus, the flow control system 12 of this invention facilitates the multicycle operation of the depicted gas turbine engine 10 by providing the fluid flow conditions that are necessary for each engine mode or cycle. In particular, such an engine effects efficient operation throughout subsonic and supersonic flight of an aircraft by duct burning and driving the aft turbine stage 38 with the combined fan stream and primary flow stream during periods of relatively high thrust requirement, i.e., takeoff, climb and high-speed supersonic cruise, and by driving the aft turbine stage 38 with the fan stream while the primary flow stream exists through the duct 36 during periods of lower thrust requirement, i.e., subsonic cruise or certain supersonic cruise conditions. As is schematically illustrated in FIG. 1, the aft turbine stage 38, a low-pressure section of the forward turbine stage 32 and the fan stage 20 are rotatively linked by a shaft 42 is supported within axially spaced apart bearings 44. In a similar fashion, a high pressure section of the forward turbine stage 32 and the axial compressor stage 26 are rotatively connected by a shaft 46 which usually coaxially surrounds the shaft 42 and is supported by a series of axially spaced apart bearings 48. With the engine stages operatively coupled in this manner, fluid flow within the engine 10 is maintained at appropriate pressure and velocity for each of the various engine cycles.

With reference to FIGS. 2 through 6, the structural arrangement of the flow control system 12 of this invention can be ascertained. As is depicted in FIG. 2, the flow control system 12 generally includes a plurality of fluid passages or duct elements which are specifically contoured and arranged to effect the above-described flow inversion with a valve assembly (generally denoted by the numeral 50) being operable to combine the two fluid streams. For ease of description, the flow control system 12 can be partitioned into three serially arranged axially extending regions or sections hereinafter referred to as the input transition section, the valve section, and the output transition section. Upon understanding the invention, it will be apparent to those skilled in the art, that these three sections can be separate components that are joined together by conventional fastening means or can be unitary in structure. Further, although the embodiment of the flow control system 12 described herein comprises a nested assemblage of axially extending individual duct elements, each having an input transition system, a valve section and an output transition section, other embodiments may be constructed wherein one or more of the described duct elements are combined into a unitary structural element.

As is best depicted by FIGS. 2 and 3, the flow control system 12 includes two types of axially extending duct elements 52 and 54, which are referred to herein with reference to the fluid flow contained and directed thereby when the invention is employed in a multicycle gas turbine engine arrangement such as is depicted in FIG. 1. Specifically, a first type of duct element is hereinafter referred to as a fan duct element 52 and the second type of duct element is hereinafter referred to as a primary duct element 54. Such terminology is solely for the sake of convenience and is not intended to limit the scope of the invention, since it will be recognized by those skilled in the art that the invention can be implemented in the use of fluid management situations other than that presented in a gas turbine engine.

In any case, as is depicted in FIGS. 2 and 3 each fan duct element 52 and each primary duct element 54 is specifically contoured and dimensioned such that the nested assemblage of duct elements 52 and 54 can be enclosed within an axially extending envelope of annular cross-sectional geometry. When viewed axially along the direction of fluid flow, the fan duct elements 52 and the primary duct elements 54, and hence the overall assemblage of duct elements, can be partitioned into the above-mentioned input transition section 56, valve sction 58, and output transition section 60.

Along the length of the input transition section 56, each fan duct element 52 and each primary duct element 54 transits from a cross-sectional geometry corresponding to an annular sector of a first radial dimension to an annular sector of a second radial dimension. More specifically, when the duct elements 52 and 54 are assembled with one another, entrance openings 62 in the forward ends of the fan duct elements 52 extend circumferentially about the outer region of the forward or entrance plane of the fluid control system to receive specific portions of the annular fan stream. In a similar manner, entrance openings 64 in the forward ends of the primary duct elements 54 extend circumferentially about the inner region of the entrance plane of the fluid control system. Thus, the annular primary flow stream and the concentrically surrounding annular fan stream that are supplied to the flow control system of this invention are effectively subdivided into a plurality of flow streams by the duct elements 52 and 54.

With continued reference to FIGS. 2 and 3, the fluid passage defined by each fan duct element 52 smoothly decreases in dimension relative to the circumferential direction of the flow control system while smoothly increasing in dimension relative to the radial direction in a manner which maintains the cross-sectional area substantially constant at all points along each fluid passage. Similarly, the circumferential dimension of each primary duct element 54 smoothly decreases downstream of the inlet opening 64 and smoothly increases in the radial direction to thereby maintain the cross-sectional area of the flow passages within the duct elements 54 substantially constant. In particular, although the boundary walls of the duct elements 52 and 54 exhibit a compound complex curvature, the flow streams contained and directed by the fan duct elements 52 are gradually diverted inwardly while the flow streams contained and directed by the primary duct elements 54 are gradually diverted outwardly. As is indicated in FIGS. 2 and 3, and specifically illustrated in FIG. 5, the compound contouring of the duct elements 52 and 54 causes a flow pattern at the entrance plane of the valve section 58 of an annular geometry in which the flow streams derived from the fan air and the flow streams derived from the primary fluid flow are circumferentially interspersed sectors of such annular flow geometry.

As previously mentioned, each duct element 52 and 54 is essentially configured in accordance with the teachings of U.S. Pat. Nos. 3,779,282 and 3,792,584, both of which are issued to Gary W. Klees and are assigned to the assignee of this invention. In this respect, those portions of U.S. Pat. Nos. 3,779,282 and 3,792,584 which relate to the contouring of nested duct elements for effecting flow inversion of two concentrically flowing annular fluid streams are hereby incorporated by reference.

Figure 5:
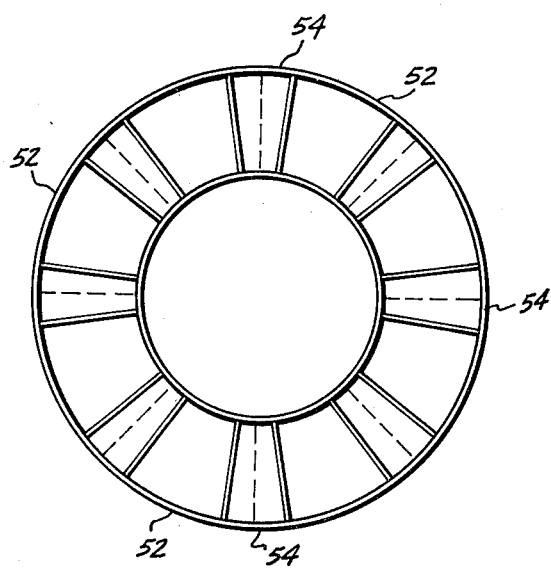
Figure 6:
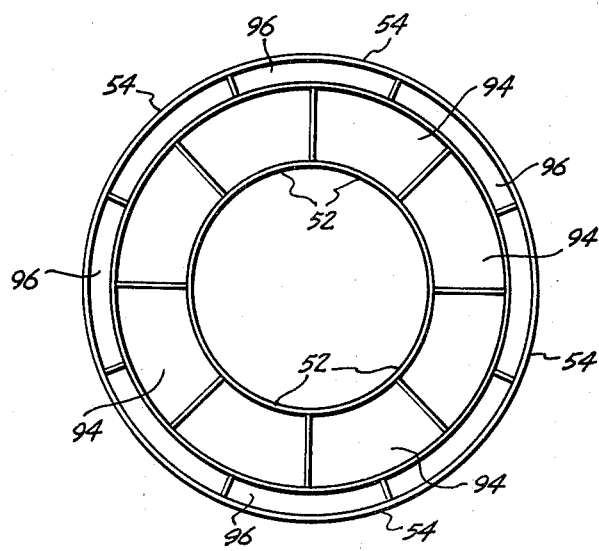

The overall cross-sectional geometry of each fan duct element 52 and each primary duct element 54 is constant throughout the axial length of the valve section 58 and corresponds to that segmented annular geometry depicted in FIG. 5. To provide an operable valve arrangement wherein the fluid streams that are derived from the primary flow either continue flowing through the primary duct elements 54 or are diverted into the circumferentially adjacent fan duct elements 52, the valve section 58 of each primary duct element 54 includes a hinge together valve assembly 50.

With particular reference to FIGS. 2 and 3, each valve assembly 50 includes two valve segments 66 of substantially identical configuration, each of which have a cross-sectional geometry substantially equal to one-half the cross-sectional geometry exhibited by the primary duct element 54 along the length of the valve section 58. Thus, the cross-sectional geometry of each valve section 66 corresponds to an annular segment having an angle of inclusion substantially equal to one-half the angle of inclusion of the annular segments defined by the primary duct elements 54 throughout the length of the valve section 58. As is illustrated in FIGS. 2 and 3, each valve section 66 includes an outer and inner arcuately contoured wall 68 and 70 which corresponds in curvature to the curvature of the outer and inner boundaries 72 and 74 within the valve section 58 of the primary duct element 54. The outer and inner walls 68 and 70 of the each valve segment 66 are interconnected by radial extending sidewalls 76 which extend axially along the interior of the sidewall boundaries 78 of the primary duct element 54. Thus, when each pair of valve segments 66 are arranged with two of the radially extending sidewalls 76 in contact with one another, the pair of valve segment 66 define two axially extending fluid passages that effectively split the primary flow streams that flow through the primary duct elements 54 into two portions of equal cross-sectional area and of substantially identical cross-sectional geometry.

To permit each pair of valve segments 66 to be actuated for diverting the flow streams derived from the primary fluid stream into the flow streams that are derived from the fan air stream, the adjacent radially extending forward edges of the sidewall 76 of each pair of valve segments 66 (those sidewalls 76 that bisect the cross-sectional geometry of the primary duct elements 54) are joined to one another and joined to a pin 84 which passes outwardly through an axially extended slot 86 in the central portion of the primary duct element outer boundary surface 72. Additionally, the oppositely disposed radially extending sidewall 76 of the valve segments 66 each include a hinge 82 which interconnects each valve segment 66 with the forward edge of an opening 88 in each sidewall boundary 78 of the primary duct elements 54. Each opening 88 is dimensioned to permit passage of the valve segments 66 and a similarly configured opening 90 is included in each sidewall boundary 92 of the valve section 58 of each fan duct element 52. Thus, when the duct elements 52 and 54 are nested together and joined to form the flow control system of the invention, axial displacement of the pins 84 in the aft direction cause the downstream ends of the valve segment 66 to pass into the valve region 58 of the fan duct elements 52. As shown in FIGS. 2 and 3, to facilitate simultaneous activation of each pair of valve segments 66, the pins 84 are each interconnected with the unison ring 34 which circumferentially surrounds the valve section 58 of the assembled duct elements 52 and 54.

Each fan duct element 52 and each primary duct element 54 is contoured over the axial length of the output transition section 60 such that the cross-sectional fluid flow pattern transists from the segmented annular configuration depicted in FIG. 5 to a flow pattern of two concentric annular flow regions. In particular, over the length of the output transition section 60 the fan duct elements 52 and a primary duct element 54 are contoured and arranged in a similar manner to the contouring of the input transition section 56 of the duct elements 52 and 54, with a cross-sectional area of each duct element 52 and 54 remaining substantially constant along the axial length of the output transition section 60. As can be seen in FIGS. 1 and 2, and as is further disclosed in the hereinbefore referenced U.S. Pat. Nos. 3,779,282 and 3,792,584, the output transition section 60 of each fan duct element 52 causes the flow stream passing therethrough to be gradually diverted inwardly for discharge through an exit opening 94 having a geometry corresponding to an annular sector. In a complementary manner, the output transition section 60 of each primary duct element 54 defines a fluid passage which gradually diverts the flow stream passing therethrough outwardly for discharge through an exit opening 96, the geometry of which also corresponds to an annular sector. As is indicated in FIGS. 2 and 3, and as can be seen most clearly in FIG. 6, the exit openings 94 and 96 of the nested assemblage of duct elements 52 and 54 collectively form segmented concentrically arranged annular discharge openings wherein the circumferentially extending exit openings 94 of the fan dust elements 52 define the inner annular discharge opening and the circumferentially extended exit openings 96 of the primary duct element 54 define the outer annular discharge opening.

Thus, when the unison ring 34 is positioned in the forwardmost position, the annularly flowing primary flow is received by the circumferentially extending primary duct element inlet openings 64 and flows directly through the primary duct elements 54 for discharge as an annular fluid stream. During this mode of operation, the fan duct element inlet openings 62 receive the annularly flowing fan stream which then flows directly through the fan duct elements 52 for discharge as an annular fluid stream that is concentrically surrounded by the discharged primary fluid stream. Accordingly, in this mode of operation, the desired flow inversion is affected. On the other hand, when the unison ring is positioned in the rearmost position, the valve segments 68 swing about the hinges 82 such that the aft end of each valve segment 66 swings into the adjoining fan duct element 52. Thus, in this mode of operation, each portion of primary fluid flow travelling along a primary duct element 52 is split into two separate fluid streams which are directed into the adjacent fan duct elements 52. As the primary flow exits the valve segments 66, mixing occurs and the combined fan flow and primary fluid flow are discharged from the exit openings 94 of the fan duct elements 52 as a single annular flow stream.

These operating modes are more fully depicted in FIGS. 7 and 8, which illustrate a "flat pattern view" of the flow control system, i.e., a plan view in which the flow control system exhibits an infinite radius. Specifically, FIG. 7 schematically illustrates flow through the system in which the subdivided portions of the fan stream and primary flow stream pass directly through the fan duct elements 52 and the primary duct elements 54 to affect flow inversion. As is schematically depicted in FIG. 8, when the unison ring 34 is slid to the aftmost position, the valve segments 66 of each pair of valve segments swing about the hinges 82 to angularly dispose the innermost radially extending sidewall 76 of the valve segments 66 from one another. In particular, the aft boundary edges of the outer and inner walls 68 and 70 of each valve segment 66 is accurately contoured such that the aft end of the valve segment 66 swings through the aligned openings 88 and 90 of the primary duct elements 54 and fan duct elements 52 (FIGS. 2 and 3). When the unison ring 34 is in the aftmost position, the innermost radially extending wall 76 are in alignment with the juxtaposed radially extending boundary surfaces 78 and 92 of the primary duct elements 54 and the fan duct elements 52 to thereby effectively provide a Y-shaped duct configuration which smoothly diverts the primary streams flowing in the primary duct elements 54 into the fan flow streams which flow through the fan duct elements 52.

Viewing FIGS. 7 and 8, it can be recognized that relatively low actuation force is required to activate the unison ring 34, especially in applications of the invention wherein the pressure exerted by the primary flow streams is equal to or exceeds the pressure inverted by the fan flow streams. In particular, when the valve segments 66 are in the paired, side by side relationship depicted in FIG. 7, neither the fan streams nor the primary flow streams exert an unbalanced force on the valve segments 66. As the unison ring 34 is moved slightly in the direction of fluid flow, the valve segments 66 tend to self-operate in situations in which the pressure of the primary fluid stream exceeds the pressure of fan streams. Yet, regardless of the relative difference in fan stream pressure and primary flow pressure, the forces on the moving duct segments 66 remain substantially balanced throughout the actuation process. Further, since the valve segments 66 constitute the only moving structure that is exposed to the fluid flow, and since the valve segments 66 are relatively small, thermal strain is generally not a problem in the practice of the invention. In this regard, the valve segment 66 and associated openings 88 and 90 in the fan duct elements 52 and primary duct elements 54 can be dimensioned for satisfactory freedom of movement while simultaneously preventing flow leakage from one portion of the flow control system to another.

In view of the above description of the invention, it can be noted that the preferred embodiments thereof are directed to situations in which the cross-sectional area of one of the received annular flow streams exceeds that of the other annular flowstream. In this respect, the drawings illustrate the situation typical to a multicycle gas turbine engine in which the cross-sectional area of the outermost fluid stream (fan flow) exceeds that of the innermost fluid stream (primary flow). When the cross sectional area of one of the received fluid streams exceeds that of the second fluid stream and the flow control system is to be containable within an annular volume having an inner radius of $r_1$ and an outer radius of $r_3$ ($r_1$ and $r_3$ being respectively equal to the outer and inner radial dimension of the coaxially flowing annular fluid streams that are received by the flow control system), it can be recognized that the individual duct elements for receiving and directing the inner and outer fluid streams respectively exhibit a cross-sectional area of $A_i/n$ and $A_o/n$, where $A_i$ and $A_o$ respectively denote the cross-sectional area of the received inner and outer fluid stream and n duct elements are employed for receiving each of the two fluid streams. In such an embodiment, the angle of inclusion of the annular segments defined by the entrance openings of each of the duct elements is $2\pi/n$ radians, and it can be shown that the angles of inclusion of the annular segments defined throughout the axial length of the valve section 58 are:

$$\alpha = 2\pi(r_3^2 - r_2^2)/n(r_3^2 - r_1^2) \text{ and}$$

$$\beta = 2\pi(r_2^2 - r_1^2)/n(r_3^2 - r_1^2)$$

where $\alpha$ is the angle of inclusion of those duct elements receiving and directing the fluid stream having the greatest cross sectional area, $\beta$ is the angle of inclusion of each duct element receiving and directing the fluid stream of least cross-sectional area and $r_2$ is a radial dimension of the circular interface that separates the two received annular flow streams. Further, it can be shown that the radial position of the circular boundary defined between the two angular flow streams that is formed by the assemblage of duct elements at the exit end of the flow control system (FIG. 6) can be expressed as $r_a^2 = r_3^2 + r_1^2 - r_2^2$, where $r_a$ is the radius of the interface boundary between the annular discharge streams.

It will be recognized by those skilled in the art that the disclosed embodiment of the invention is exemplary in nature and that many variations are within the scope and the spirit of this invention. For example, and as previously mentioned, the flow control system of this invention is not limited to application in gas turbine engines of the multicycle variety, but can be utilized in any flow control situation in which inversion of concentrically flowing annular fluid streams and selective combination of the two flow streams for discharge as a singular annular fluid stream is desired. Further, in situations in which the cross-sectional area of the innermost annular fluid stream that is supplied to the flow control system exceeds the cross-sectional area of the outermost annular flow stream, a valve arrangement such as the valve segments 66 can be employed within the duct elements that receive the outermost fluid stream to thereby effect selective flow inversion and discharge of both fluid streams through an annular discharge opening. Additionally, although the invention has been described as having two operable modes of flow inversion and flow accommodation, it can be recognized that the flow control system of this invention can also be operated such that the valve segments 66 do not totally divert the fluid streams flowing through the duct elements which contain the valve segments into the adjoining duct elements to thereby selectively control the relative amount of total fluid flow that exits each of the two annular discharge openings. In such a situation, the unison ring 34 is selectively positioned between the forwardmost and afmost positions. Alternatively, the valve segments 66 can be configured for receiving and diverting only a portion of the fluid flowing through the duct elements in which the valve segments are mounted.

The embodiments of the invention in which an exclusive property or privilege is claimed are defined as follows:

1. A flow control system for receiving first and second fluid streams wherein each of said first and second fluid streams are annular in cross-sectional geometry and said first fluid stream concentrically surrounds said second fluid stream, said flow control system being operable to discharge said first and second fluid streams as annular fluid streams wherein said second fluid stream concentrically surrounds said first fluid stream and being operable to discharge said first and second fluid streams as a single annular fluid stream, said flow control system comprising:

an axially extending annular fluid duct including a first plurality of fluid passages having inlet openings of a geometry corresponding to annular sector for receiving and containing sectorial portions of said first annular fluid stream and including a second plurality of fluid passages having inlet openings of a geometry corresponding to an annular sector of said second annular fluid stream, said inlet openings of said first plurality of fluid passages being arranged in circumferential juxtaposition with one another to collectively define an annular entrance opening commensurate with said cross-sectional geometry of said first fluid stream, said inlet openings of said second plurality of flow passages being arranged in circumferential juxtaposition with one another to collectively define an annular opening commensurate with said cross-sectional geometry of said second fluid stream, each of said fluid passages of said first plurality of fluid passages having a substantially constant cross-sectional area at each point along the axial length of said annular fluid duct, each of said fluid passages of said second plurality of fluid passages having a substantially constant cross-sectional area at each point along the axial length of said annular fluid duct, said first and second plurality of fluid passages changing in cross-sectional geometry over a first predetermined axial region of said fluid duct from said geometry of said inlet openings to a geometry corresponding to an annular sector with said first plurality of fluid passages being circumferentially interspersed with said second plurality of fluid passages to define a sectorially segmented annular flow pattern in which portions of said first fluid stream and portions of said second fluid stream occupy alternate segments of said sectorially segmented flow pattern, said plurality of first and second fluid passages being maintained in said circumferentially interspersed sectorial cross-sectional geometry over a second axially extending region of said annular fluid duct, said plurality of first and second fluid passages changing in cross-sectional geometry over a third predetermined axial region of said fluid duct from said circumferentially interspersed segmented cross-sectional geometry to discharge openings having a geometry corresponding to an annular segment, said discharge openings of said first plurality of fluid passages being arranged in circumferentially extending juxtaposition with one another to collectively define a first annular exit opening, said discharge openings of said second plurality of fluid passages being arranged in circumferentially extending juxtaposition with one another to collectively define a second annular discharge opening to coaxially surround said first annular discharge opening; and, a plurality of valve means, each of said valve means associated with and mounted in a separate fluid passage of one of said first and second pluralities of fluid passages within said second axially extending region of said fluid duct, said plurality of valve means being operable to maintain fluid flow between said inlet and outlet openings of said associated fluid passages to discharge said first fluid streams from said first said annular discharge opening and to discharge said second fluid streams from said second annular discharge opening, said plurality of valve means being further operable to redirect fluid flowing through said fluid passages associated with said valve means into adjacent ones of said circumferentially interspersed fluid passages to discharge said first and second fluid streams through one of said first and second discharge openings as a single fluid stream of annular cross-sectional geometry.

2. The flow control system of claim 1 wherein each of said valve means is mounted in a separate one of said second plurality of fluid passages, said plurality of valve means being operable to permit said received sectorial portion of said second annular fluid stream to flow directly through said second plurality of fluid passages for discharge through said second annular discharge opening, said plurality of valve means being operable to divert said received sectorial portion of said second fluid stream into adjacent ones of said first plurality of fluid passages to discharge first and second fluid streams through said first annular discharge opening as a single fluid stream.

3. The flow control system of claim 1 wherein said axially extending annular fluid duct is comprised of a nested assemblage of axially extending duct elements, each of said duct elements defining one of said fluid passages of said first and second plurality of fluid passages.

4. The flow control system of claim 2 wherein each of said valve means comprise a pair of valve segments, each of said valve segments having a cross-sectional area substantially equal to one-half the cross-sectional area of each of said second plurality of fluid passages within said second axially extending region of said fluid ducts, each of said pairs of valve segments being mounted within a separate one of said second plurality of fluid passages, each of said pairs of valve segments being positioned to extend in axial juxtaposition with one another for discharging said first fluid streams from said first annular discharge opening and discharging said second fluid streams from said second annular discharge opening, said valve segments of each of said pair of valve segments being further positionable to extend at least partially into each adjacent fluid stream of said second plurality of fluid streams for discharging said second plurality of fluid streams into said first plurality of flowstreams to discharge said first and second plurality of flow streams from said first annular discharge opening as combined fluid flow.

5. The flow control system of claim 4 wherein said axially extending annular fluid duct is comprised of a nested assemblage of axially extending duct elements, each of said duct elements defining one of said fluid passages of said first and second plurality of fluid passages.

6. The flow control system of claim 4 further comprising means for simultaneously positioning each of said pairs of valve segments.

7. A flow control system operable to invert the relative position of first and second annular fluid streams which are received in an orientation in which said first annular fluid stream coaxially surrounds said second annular fluid stream and operable to discharge said first and second fluid streams as a single mixed flow fluid stream of annular cross sectional geometry, said flow control system comprising:

a first and second plurality of duct elements for respectively receiving and directing predetermined portions of said first and second annular flow streams, each of said first and second plurality of duct elements including n individual duct elements, each of said end duct elements of said first plurality of n duct elements defining a fluid passage of a first predetermined cross sectional area and each of said n duct elements of said second plurality of duct elements defining a fluid passage of a second predetermined cross sectional area, said first and second plurality of duct elements being configured and arranged for nested assemblage with one another within a spatial volume of axially extending annular geometry, each of said first and second plurality of duct elements including an entrance opening of a geometry corresponding to an annular sector having an angle of inclusion substantially equal to $2\pi/n$ radians, said entrance openings of said first plurality of duct elements being circumferentially disposed with respect to one another in said nested assemblage to define a first subdivided annular opening for partitioning said first fluid stream into n individual flow streams, said entrance openings of said second plurality of n duct elements being circumferentially disposed with one another in said nested assemblage to define a second substantially annular opening for partitioning said second fluid stream into n individual flow streams, said first and second plurality of duct elements being configured and arranged along the axial length of said nested assemblage to establish an axial region of said flow control system in which said individual flowstreams derived from said first annular fluid stream and said individual flowstreams derived from said second annular fluid stream are circumferentially interspersed with one another and define segments of an annular flow pattern, said first and second plurality of duct elements being further configured and arranged along the remaining axial length of said annular assemblage to define first and second subdivided discharge openings of annular geometry, said first plurality of duct elements each including an exit opening of a geometry corresponding to an annular sector of said first annular discharge opening having an angle of inclusion substantially equal to 2π/n radians, said exit opening of said first plurality of duct elements being circumferentially disposed relative to one another to define said first discharge opening, said second plurality of duct elements each including an exit opening of a geometry corresponding to an annular sector of said second annular discharge opening having an angle of inclusion substantially equal to 2π/n radians, said exit openings of said second plurality of duct elements being circumferentially disposed relative to one another to define said second discharge opening, said first and second discharge openings being coaxially disposed relative to one another with said exit openings of said first plurality of duct elements being concentrically surrounded by said second exit openings of said second plurality of duct elements; and, a plurality of n valve means mounted within said axial region of said flow control system in which said individual flow streams derived from said first annular fluid stream and said individual flow streams derived from said second annular fluid stream are circumferentially interspersed with one another to define segments of an annular flow pattern, each of said valve means being individually mounted in an individual one of said n duct elements of one of said first and second plurality of duct elements, each of said valve means being operable to provide uninterrupted flow of said first and second individual flow streams through said axial region of said flow control system to discharge said first fluid stream through said first discharge opening and discharge said second fluid stream through said second discharge opening, said valve means being further operable for directing one of said first and second plurality of individual flow streams into the other one of said plurality of individual flow streams to discharge both of said first and second annular fluid streams from one of said first and second discharge openings.

8. The flow control system of claim 7 wherein said first annular fluid streams exhibits a cross sectional area that exceeds the cross sectional area of said second annular fluid stream and wherein each of said valve means are mounted in associated with separate ones of said first plurality of duct elements for selectively discharging said first fluid stream through said first discharge opening and said second fluid stream through said second discharge opening and for selectively discharging both said first and second fluid streams through said first discharge opening.

9. The flow control system of claim 8 further comprising means for simultaneously operating each of said plurality of valve means.

10. The flow control system of claim 8 wherein each of said valve means comprises a pair of axially extending valve segments, each of said valve segments having a cross sectional geometry dimensionally commensurate with one-half the cross-sectional geometry exhibited by each of said duct elements of said first plurality of duct elements within said axial region of said flow control system in which said first plurality of flow passages are annular segments that are circumferentially interspersed with said second plurality of flow passages, each of said valve segments including a circumferentially extending outer wall, a circumferentially extending inner wall and first and second radially extending walls interconnecting said inner and outer walls, the upstream boundary of said first radially extending walls of each of said pair of valve segments being flexibly joined with one another, said second radially extending walls of each pair of said valve segments being hinged to the oppositely disposed radially extending walls of said associated duct element of said first plurality of duct elements, said radially extending walls of each of said first plurality of duct elements and the adjoining radially extending walls of said second plurality of duct elements each including an opening dimensioned and arranged for circumferential passage of the downstream portion of said valve segments, said flow control system further including actuation means operable to a first position for placing each of said pair of valve segments in axially extending juxtaposition with one another to discharge said first fluid stream from said first annular discharge opening and discharge said second fluid stream from said second annular discharge opening and operable to a second position for axially displacing said upstream boundaries of said joined together first radially extending walls of said pair of valve segments to swing the downstream portion of each of said valve segments into the adjoining ones of said second plurality of flow streams for discharging said first plurality of flow streams into said second plurality of flow streams to thereby cause said first and second annular fluid streams to be discharged from said second discharge opening.

11. The flow control system of claim 10 wherein each of said valve means includes a radially extending pin projecting outwardly from said joined together first radially extending walls of each of said valve segments, and wherein each of said first plurality of duct elements includes an axially extending slot for passage of said radially extending pin, said flow control system further comprising a unison ring circumferentially surrounding said annular assemblage of duct elements, said unison ring being joined to each of said radially extending pins and being positionable between an upstream position in which the valve segments of each of said pair of valve segments extend in axial juxtaposition with one another and a downstream position in which said downstream portions of said valve segments pass circumferentially into the adjacent ones of said second plurality of flow-streams.

* * * * *